J. E. JOHNSON.
RATCHET FEEDING MECHANISM FOR BREAD CUTTING MACHINES.
APPLICATION FILED APR. 15, 1913.

1,112,911.

Patented Oct. 6, 1914.
2 SHEETS—SHEET 1.

WITNESSES
Samuel Payne
Karl H. Butler

INVENTOR
J. E. Johnson.
By Henry C. Evert
ATTORNEY

J. E. JOHNSON.
RATCHET FEEDING MECHANISM FOR BREAD CUTTING MACHINES.
APPLICATION FILED APR. 15, 1913.
1,112,911.
Patented Oct. 6, 1914.
2 SHEETS—SHEET 2.
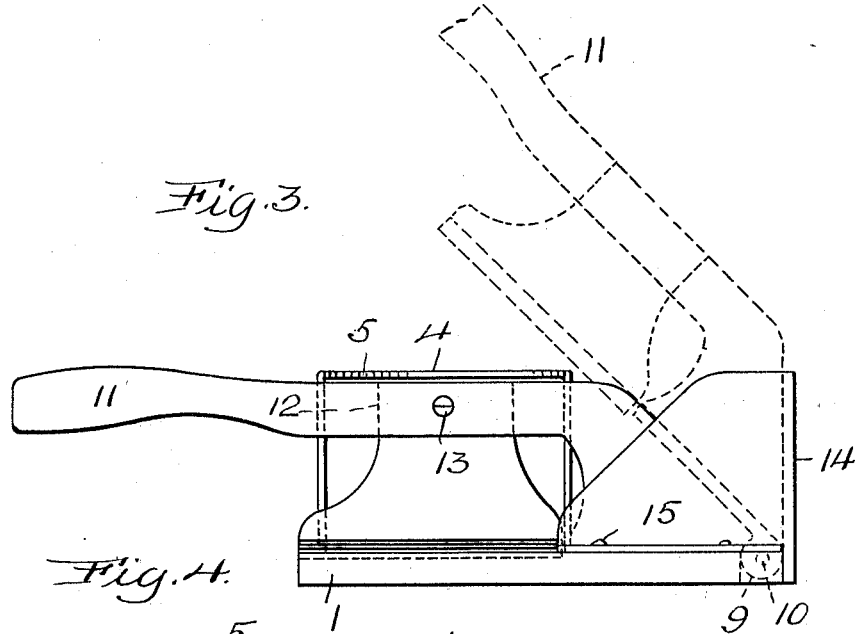
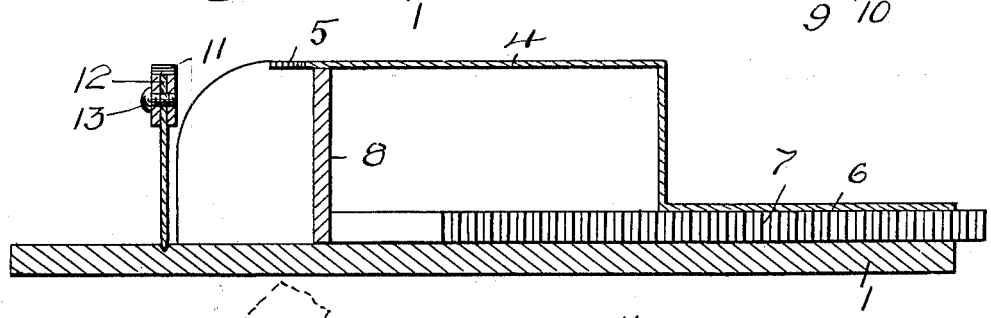
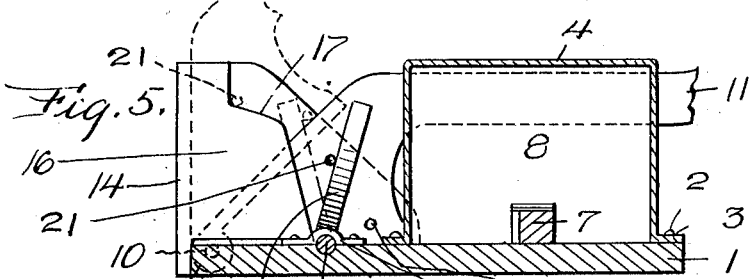
WITNESSES
Samuel Payne
Karl H. Butler
INVENTOR
J. E. Johnson
By Henry C. Evert
ATTORNEY.

UNITED STATES PATENT OFFICE.

JOHN EDWARD JOHNSON, OF MOUNDSVILLE, WEST VIRGINIA.

RATCHET FEEDING MECHANISM FOR BREAD-CUTTING MACHINES.

1,112,911. Specification of Letters Patent. Patented Oct. 6, 1914.

Application filed April 15, 1913. Serial No. 761,304.

*To all whom it may concern:*

Be it known that I, JOHN EDWARD JOHNSON, a citizen of the United States of America, residing at Moundsville, in the county of Marshall and State of West Virginia, have invented certain new and useful Improvements in Ratchet Feeding Mechanism for Bread-Cutting Machines, of which the following is a specification, reference being had therein to the accompanying drawing.

This invention relates to a ratchet feeding mechanism for bread cutting machines, and the primary object of my invention is to provide a simple and inexpensive device that can be advantageously used in connection with the manually operated machines used in restaurants, hotels and other places for evenly and uniformly slicing or cutting loaves of bread, cake or other matter.

Another object of this invention is to provide a strong and durable feeding mechanism used in connection with a bread cutting device that has positive and reliable means, as hereinafter set forth, for automatically and intermittently feeding a loaf of bread or piece of material into position that it can be easily and quickly sliced or cut into uniform portions.

A further object of this invention is to provide a device of the above type embodying a loaf holding frame, a feeding plunger, a knife, and a mechanism actuated by the movement of said knife for intermittently moving said plunger, the above elements being compactly arranged to provide a structure that is highly efficient for the purposes for which it is intended.

With the above and other objects in view the invention resides in the novel construction, combination and arrangement of parts to be hereinafter specifically described and then claimed.

Reference will now be had to the drawings, wherein:—

Figure 1:
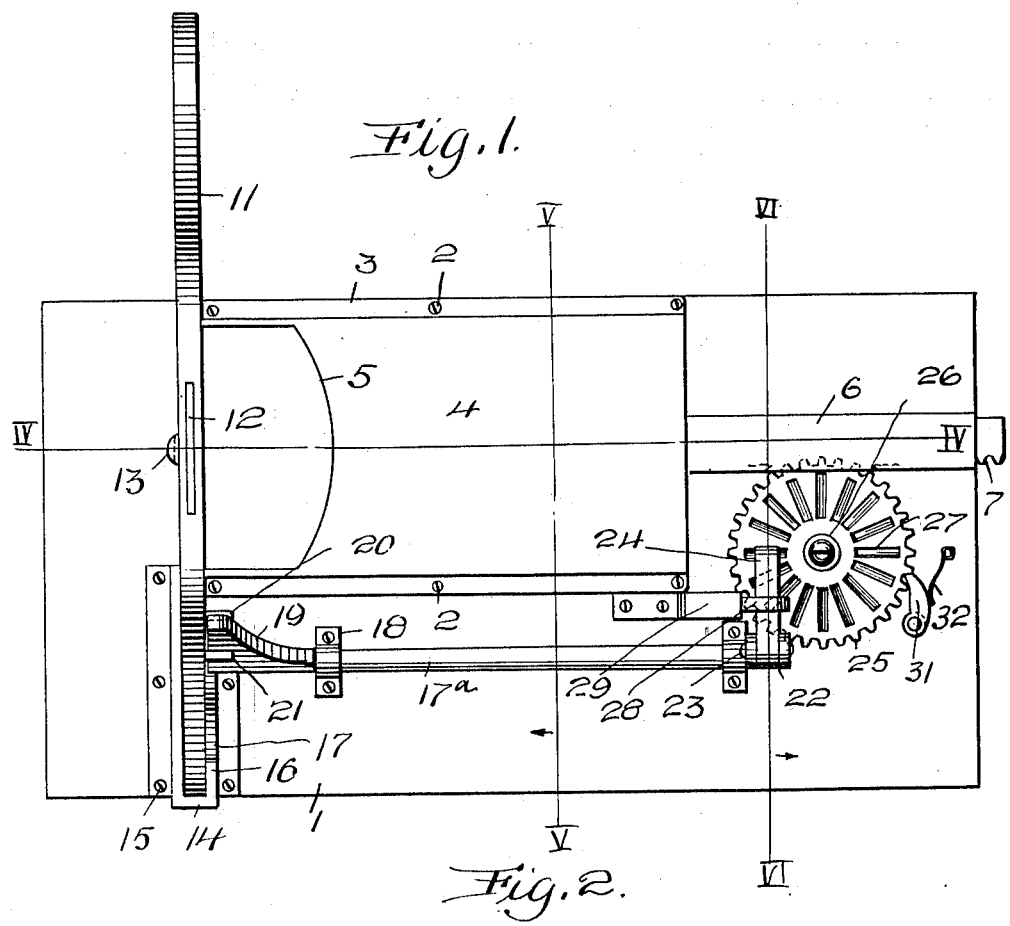
Figure 2:
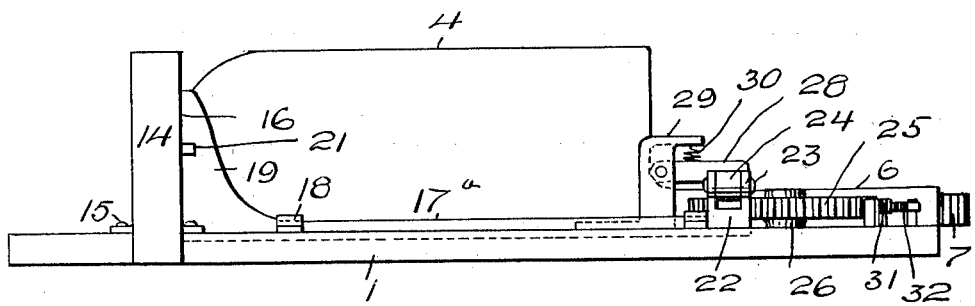

Figure 1 is a plan of the ratchet feeding mechanism for bread cutting machines, Fig. 2 is a side elevation of the same, Fig. 3 is an end view of the device, Fig. 4 is a longitudinal sectional view, taken on the line IV—IV of Fig. 1, Fig. 5 is a cross sectional view, taken on the line V—V of Fig. 1, and Fig. 6 is a similar view taken on the line VI—VI of Fig. 1.

A ratchet feeding mechanism for bread cutting machines in accordance with this invention comprises a base plate 1 that is rectangular in plan and mounted upon said base plate by screws 2 or other fastening means are the lateral flanges 3 of a rectangular housing or casing 4, said housing being disposed longitudinally of the base plate, intermediate the ends thereof, and having the top thereof cut away, as at 5 whereby the end of a loaf of bread or other material to be cut will be exposed to the action of a slicing knife located at the end of said housing. An end of the housing 4 has a longitudinal extension 6 for a rack 7, carried by a presser head 8, said presser head and said rack constituting a plunger movable relatively to the housing 4, whereby when the rack is shifted longitudinally of the extension 6 the presser head 8 will shift a loaf of bread or piece of material within the housing 4 toward the open end thereof.

Pivotally mounted in an opening 9 provided therefor in the base plate 1 by a pin 10 is the inner end of a handle 11 and said handle has a detachable hatchet-shaped slicing blade 12 that is retained in engagement with the handle 11 by a set screw 13 or other fastening means. The handle 11 is arranged transversely of the base plate 1 at the open end of the housing 4 and the slicing blade 12 is disposed relatively to said handle whereby it will sever matter protruding from the casing 4. The pivoted end of the handle 11 is operable between a channel-shaped guide 14 that is secured to the base plate 1, as at 15 and one of the walls 16 of said guide is cut away, as at 17 to provide a stop 18 that coöperates with an end wall of the guide in limiting the movement of the handle 11.

Arranged longitudinally of the base plate 1 and partially countersunk therein is a longitudinal shaft 17ᵃ that is held in position by bearings or straps 18. One end of the shaft 17ᵃ has a radially disposed arm 19 that extends between spaced apart pins 20 and 21 carried by the handle 11. The opposite end of the shaft 17ᵃ has a crank 22 and said crank is bifurcated and provided with a pivot pin 23 for a pawl 24 that extends over the top flat surface of a pinion 25, which is revolubly mounted upon a post 26, carried by the base plate 1. The pinion 25 meshes with the rack 7 and the flat surface of said pinion is provided with radially disposed teeth 27 engaged by the pawl 24.

Extending over the pawl 24 is a spring pressed retaining member 28 that is pivotally mounted in a housing 29, located adjacent to the pinion 25. In the housing is a compression spring 30 that bears upon the retaining member and said member is adapted to retain the pawl 24 normally in engagement with the pinion 25. Located upon the base plate, adjacent to said pinion is a pivoted dog 31 that is held in engagement with the peripheral teeth of the pinion by a small compression spring 32 carried by said base plate.

To place the bread cutting device in operation, the presser head 8 and the rack 7, constituting the plunger of the housing 4, are placed in a retracted position and a loaf of bread or the material to be sliced placed in the open end of the housing. This is accomplished when the handle 11 is raised. When the handle is lowered to slice the protruding end of the loaf of bread, the pin 21 engages the arm 19 and when the handle 11 is again raised, the pin 20 engages the arm 19, rocks the shaft 17 and shifts the pawl 24 whereby it will pull upon the pinion 25. With said pinion meshing with the rack 7 the plunger is advanced in the housing 4 and consequently the loaf of bread therein. The loaf of bread is advanced a sufficient distance to permit of the blade again slicing the same when said blade is lowered. When the blade is lowered the pin 21 engages the arm 19, rocks the shaft 17 and shifts the pawl 24, whereby it will obtain a fresh grip upon the pinion 25. The spring pressed dog 31 prevents accidental movement of the pinion 25 and when the plunger is to be placed in a retracted position, whereby a loaf of bread can be placed in the housing 4, the spring pressed dog 31 is shifted out of engagement with the peripheral teeth of the pinion 25 whereby said pinion can revolve as the rack 7 is shifted.

From the foregoing it will be observed that I have devised novel means that are automatically actuated by the movement of a slicing blade and handle thereof for intermittently feeding a loaf of bread into position to be sliced, and while I have herein described the preferred form of mechanism for accomplishing this purpose I desire it to be understood that the structural elements are susceptible to such variations and modifications as fall within the scope of the appended claims.

What I claim is:—

1. A feeding mechanism comprising a longitudinally and intermittently movable shifting element, an intermittently revoluble actuating member for said element, said member provided with radially disposed recesses, a spring controlled pulling member engaging in said recesses for intermittently shifting said actuating member, a rock shaft for operating said actuating member, a pivoted element, and pins carried by said pivoted element and engaging with said rock shaft for alternately operating it in opposite directions.

2. A feeding mechanism comprising a longitudinally and intermittently movable shiftable element, an intermittently revoluble actuating member for said element, said member provided with radially disposed recesses, a spring controlled pulling member engaging in said recesses for intermittently shifting said actuating member, a rock shaft for operating said actuating member, a pivoted element, pins arranged on said pivoted element and engaging with said rock shaft for alternately operating it in opposite directions, and a dog arranged to prevent movement of said actuating member in a direction opposite to that imparted to it by said pulling member.

3. A feeding mechanism comprising a longitudinally and intermittently movable shifting element, an intermittently revoluble actuating member for said element, said member provided with radially disposed recesses, a spring controlled pulling member engaging in said recesses for intermittently shifting said actuating member, a rock shaft for operating said actuating member, a radially disposed arm carried by said rock shaft, and a pivoted element provided with pins engaging with said arm for alternately rocking said shaft in opposite directions.

4. A feeding mechanism comprising a longitudinally and intermittently movable shifting element provided with a rack, an intermittently operating pinion engaging said rack for shifting said element and provided with spaced radially disposed recesses, a spring pressed pulling member engaging in said recesses for intermittently shifting said pinion, a dog arranged to prevent back rotation of said pinion, a rock shaft carrying said pulling member and adapted when actuated to shift said member, an arm projecting from said shaft, and a pivoted element provided with stops engaging with said arm for alternately locking said shaft in opposite directions.

In testimony whereof I affix my signature in the presence of two witnesses

JOHN EDWARD JOHNSON.

Witnesses:
E. W. JONES,
NANNIE E. JOHNSON.